United States Patent
Zhao et al.

(10) Patent No.: US 12,179,266 B2
(45) Date of Patent: Dec. 31, 2024

(54) 3D PRINTED MAGNETOCALORIC DEVICES WITH CONTROLLED MICROCHANNELS AND MAGNETIC ANISOTROPY AND METHODS OF MAKING THE SAME

(71) Applicant: VIRGINIA COMMONWEALTH UNIVERSITY, Richmond, VA (US)

(72) Inventors: Hong Zhao, Glen Allen, VA (US); Radhika Barua, Glen Allen, VA (US); Ravi L. Hadimani, Glen Allen, VA (US); Lilly Balderson, Aylett, VA (US)

(73) Assignee: VIRGINIA COMMONWEALTH UNIVERSITY, Richmond, VA (US)

( * ) Notice: Subject to any disclaimer, the term of this patent is extended or adjusted under 35 U.S.C. 154(b) by 180 days.

(21) Appl. No.: 17/319,554

(22) Filed: May 13, 2021

(65) Prior Publication Data

US 2022/0362851 A1    Nov. 17, 2022

(51) Int. Cl.
| | |
|---|---|
| *B33Y 70/00* | (2020.01) |
| *B22F 1/105* | (2022.01) |
| *B22F 1/107* | (2022.01) |
| *B22F 5/10* | (2006.01) |
| *B22F 10/22* | (2021.01) |
| *B22F 10/50* | (2021.01) |

(Continued)

(52) U.S. Cl.
CPC ............. *B22F 10/22* (2021.01); *B22F 1/105* (2022.01); *B22F 1/107* (2022.01); *B22F 5/10* (2013.01); *B22F 10/50* (2021.01); *B22F 10/60* (2021.01); *B33Y 10/00* (2014.12); *B33Y 40/20* (2020.01); *B33Y 70/00* (2014.12); *B33Y 80/00* (2014.12); *H01F 1/015* (2013.01); *B22F 3/1021* (2013.01); *B22F 2202/05* (2013.01); *B22F 2301/355* (2013.01)

(58) Field of Classification Search
CPC ................................ B22F 1/107; H01F 1/015
See application file for complete search history.

(56) References Cited

U.S. PATENT DOCUMENTS

| | | | |
|---|---|---|---|
| 2012/0064448 A1* | 3/2012 | Sakamoto | H01F 1/37 252/62.54 |
| 2015/0037558 A1* | 2/2015 | Dubrez | C22C 38/005 264/328.17 |

(Continued)

FOREIGN PATENT DOCUMENTS

KR    2018085554 A   *   7/2018  ............. H01F 1/015

OTHER PUBLICATIONS

Taylor, Shannon L., Ramille N. Shah, and David C. Dunand. "Ni—Mn—Ga micro-trusses via sintering of 3D-printed inks containing elemental powders." Acta Materialia 143 (2018): 20-29 (Year: 2018).*

(Continued)

*Primary Examiner* — Samir Shah
*Assistant Examiner* — Sean P. O'Keefe
(74) *Attorney, Agent, or Firm* — WC&F IP

(57) ABSTRACT

A polymer-assisted 3D printing method and ink compositions are used to manufacture magnetocaloric devices having many applications including in heat pumps, refrigerators, etc. The ink compositions and printing methods can produce compositionally graded, anisotropically aligned magnetocaloric architectures with designed pores and channels, to bring forth significant improvement in heat exchange efficiency.

5 Claims, 7 Drawing Sheets

(51) Int. Cl.
*B22F 10/60* (2021.01)
*B33Y 10/00* (2015.01)
*B33Y 40/20* (2020.01)
*B33Y 80/00* (2015.01)
*H01F 1/01* (2006.01)
*B22F 3/10* (2006.01)

(56) References Cited

U.S. PATENT DOCUMENTS

2016/0354841 A1* 12/2016 Vieyra Villegas ......... B01J 2/16
2020/0400352 A1* 12/2020 Nakamura .............. H01F 1/015

OTHER PUBLICATIONS

Al-Milaji, Karam N., et al. "Differential effect of magnetic alignment on additive manufacturing of magnetocaloric particles." AIP Advances 10.1 (2020): 015052. (Year: 2020).*

* cited by examiner a)

b)

3D PRINTED MAGNETOCALORIC DEVICES WITH CONTROLLED MICROCHANNELS AND MAGNETIC ANISOTROPY AND METHODS OF MAKING THE SAME

FIELD OF THE INVENTION

The invention is generally directed to methods and materials for manufacturing magnetocaloric devices through polymer-assisted 3D printing. More particularly, the invention enables manufacturing the magnetocaloric devices that are compositionally graded, anisotropically aligned magnetocaloric architectures with designed pores and channels, to bring forth significant improvement in heat exchange efficiency.

BACKGROUND

Magnetocaloric materials are a special class of magnetic materials which exhibit what is termed the magnetocaloric effect (MCE). In such a material, when applying an external magnetic field, the originally random magnetic moments are aligned leading to heating of the material. Usually heat is transferred from the magnetocaloric material to a circulating medium (e.g., water) for the heating cycle. When the magnetic field is turned off, the aligned magnetic moments revert back to the random orientation, resulting in cooling of the material. Heat transfer is enabled from the circulating medium to the magnetocaloric materials for the cooling cycle.

A key deficiency of current magnetocaloric devices is the absence of effective shaping technologies for the production of a porous regenerator, the centerpiece of any caloric cooling device (an example of which is depicted in FIG. 1, wherein a multi-material magnetocaloric regenerator bed is shown between a cold side heat exchanger and a hot side heat exchanger. The regenerator bed may be a packed particle bed, stacked plates with spacer layers, or microchanneled heat exchange structures. The regenerator bed is alternately magnetized and demagnetized as it moves in and out of a permanent magnet array subject to linear actuation (Happlied). The geometric shape of the regenerator is important for maximizing heat transfer between solid matrix and fluid, while keeping the pressure drop and demagnetization effects as small as possible. Further, the regenerators must have a porous microstructure that will allow the device to volumetrically expand and shrink when applying/removing the magnetic field, thereby minimizing the magnetic and thermal stresses in the devices. Another deficiency in the magnetic regenerator is the inability to functionally grade the magnetocaloric material in order to maximize the relative cooling power (RCP).

To date, research efforts to produce magnetocaloric regenerators are predominantly focused on the production of packed particle beds and plane plates that can be stacked and separated by spacers to provide channels for the heat-exchanger fluid. Both structures possess inherent processing challenges that reduce their performance once integrated into a device. Packed beds tend to disintegrate leading to pressure drop along the length of the regenerator, and ultimately leads to flushing of small particles into the surrounding heat-exchange system. Subtractive manufacturing methods do not satisfy the strict geometrical requirements required to provide large thermal efficiency (thickness <0.1 mm; spacing: ~0.075 mm) for parallel plates. Further, due to the issues related to mechanical brittleness, the regenerator plates are generally composites consisting of a caloric powder and a polymer binder. The binder dramatically reduces the amount of active material in the plates and dilutes the caloric response while decreasing the thermal conductivity. Powder bed fusion based additive manufacturing methods such as selective laser sintering are expensive and fraught with issues associated with melting and re-crystallizing of the particles.

SUMMARY

In one aspect, the invention provides a method and materials that allow for directly printing porous, compositionally graded, magnetocaloric structures, with complex architectures.

In another aspect of the invention, the invention provides ink formulations which, when printed, produce magnetocaloric structures. Preferably, the ink formulation includes 20-95 wt % solids of magnetocaloric material; 5-80 wt % solids of polymeric binder; and one or more solvents, wherein the polymeric binder and one or more solvents have a polymer-to-solvent ratio of 0.01 g/mL-0.5 g/mL (the solvents being present to dissolve the polymer, thereby creating a printable ink formulation).

In yet another aspect of the invention, the invention provides a printing methodology whereby enhanced alignment is achieved in a magnetocaloric structure.

Although extrusion-based 3D printing is quite often used in making prototypes and functional devices, this invention differs in the roles of the polymers and additives in the final printed composites. The polymers act as binding agents for the magnetic particles, most of which are burned off during the post-treatment process. Additives such as graphene nanoplatelets enhance heat transfer and mechanical strength of the printed magnetocaloric devices, in addition to functioning as viscosity modifier for ink formulation. The alignment of magnetic particles by applying an external magnetic field during printing results in anisotropic magnetic crystallinity and enhances the magnetocaloric responses. One advantage of the invention lies in its capability to print a compositionally graded structure.

DETAILED DESCRIPTION

Figure 1:
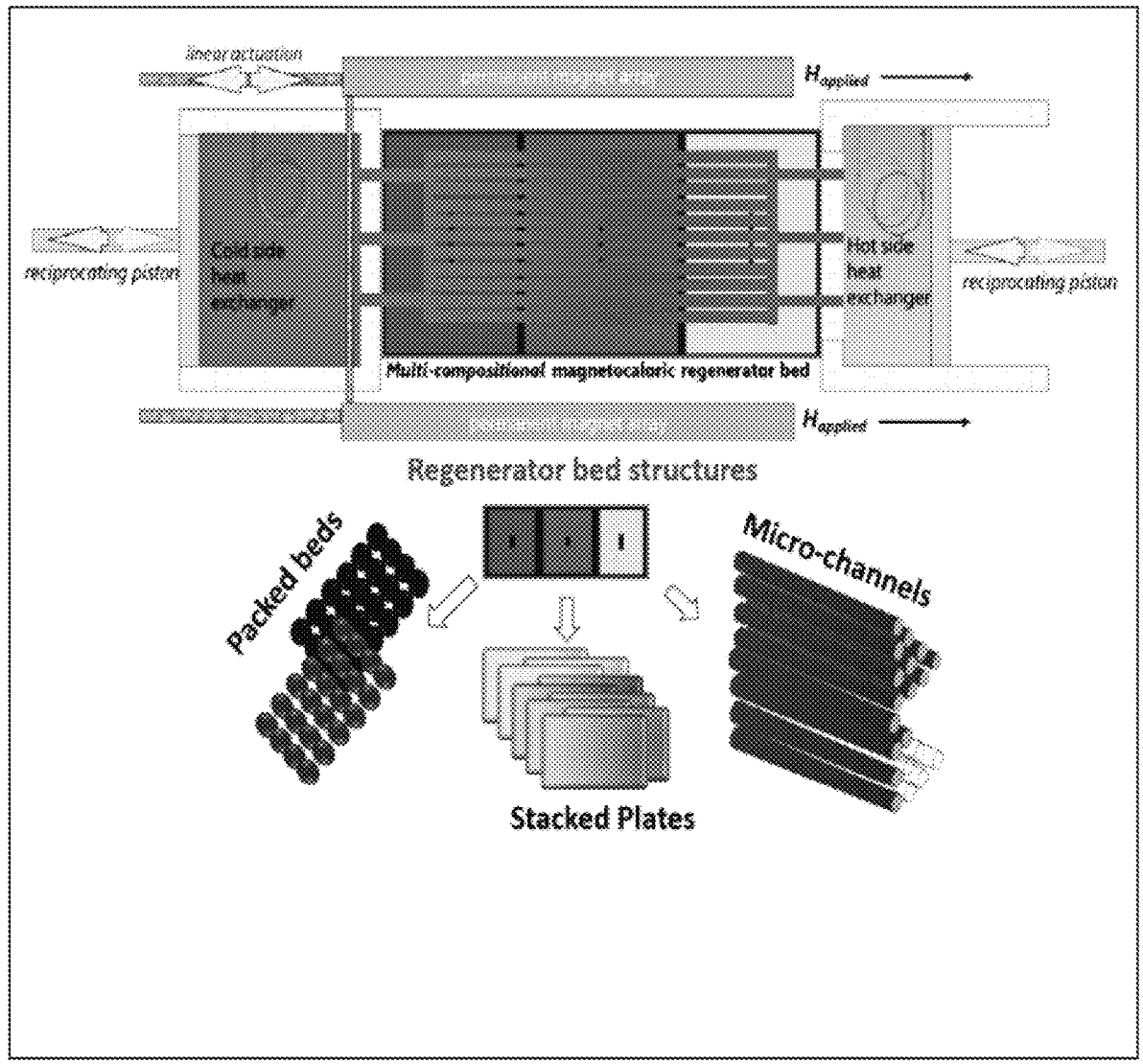
FIG. 1 is a schematic of an Active Magnetic Regenerator (AMR) cooling device, where the working caloric material is shaped as a heat exchange regenerator with voids to allow flow of a heat exchange fluid.

In one aspect of the invention, near-net shaped magnetocaloric structures are printed for modular integration into pre-existing magnetocaloric devices. In other aspects of the invention magnetocaloric structures are printed for integration into new designs and configurations of magnetocaloric devices.

A key component of this fabrication process is a unique ink formulation comprising magnetocaloric material (20-95 wt %), mixed with a polymer binder (5-80 wt %), and thermally conductive additives (0-10 wt %). The magnetocaloric materials, polymer, and thermally conductive additives are incorporated within a multi-solvent system. In the ink formulation, one or more polymers in the polymeric binder act as sacrificial binding agents for magnetic particles which make up the magnetocaloric material, and the solvents dissolve the polymer binders and regulate the volatility and viscosity of the ink. The additives, when included in the formulation, help achieve desirable shear-thinning properties as well as enhance thermal conductivity in the final printed devices. Enhanced thermal conductivity is preferred for a robust printing process.

Non-limiting examples of magnetocaloric powder materials may include: FeRh, $Gd_5Si_2Ge_2$, $Gd_5(Si_{1-x}Ge_x)_4$ (where $0<x<1$), Co- and H-doped $La(Fe_{13-x}Si_x)$ (where $0<x<1$), $MnAS_{1-x}Sb_x$ (where $0<x<1$), MnFe(P, As, Si), $Co(S_{1-x}Se_x)_2$ (where $0<x<1$), $AlT_2B_2$ (T=Fe,Mn, Ni,Co), NiMnSn, MnM'X (M'=Fe,Co, Ni; X=Si,Ga,Ge,Al), or $R_{1-x}M_xMnO_3$, (where $0<x<1$, R=lanthanide, M=Ca, Sr and Ba).

In some embodiments, the magnetocaloric powder is mixed with a polymer or a polymer mixture in a 3D printing ink composition. Acting as binder materials, these polymers facilitate the 3D printing process and hold the magnetocaloric powder together in the printed structures. During the first stage of post treatment (usually less than 500° C.), the polymer binders will be removed from the printed structures through thermal decomposition. In some embodiments, the 3D printing ink composition comprises 5-80 wt %, preferably 5-50 wt %, more preferably 5-20 wt % of polymers. Examples of polymers, which may be mixed with the magnetocaloric powders in the ink composition may include, but are not limited to, polylactide (PLA) including poly-L-lactide (PLLA), poly(lactic-co-glycolic) acid (PLGA), polystyrene (PS), polyethylene oxide (PEO), polyglycolide (PGA), or polycaprolactone, caprolactones, polydioxanones, polyanhydrides, polyorthocarbonates, polyphospliazenes, chitin, chitosan, poly(amino acids), and polyorthoesters, and copolymers, terpolymers and combinations and mixtures thereof. Additionally, a plurality of biodegradable polymers derived from natural sources such as modified polysaccharides (cellulose, chitin, chitosan, dextran) or modified proteins (fibrin, casein) may also be used. These examples of biodegradable polymers which may be utilized in addition to a preferred synthetic polymer and are not intended to be limiting or exhaustive but are intended to be illustrative of potential polymers which may be used. In these embodiments, the polymer of choice will be one that does not react with the magnetocaloric materials, and can be removed from the printed structures through thermal decomposition and leave minimum residues after thermal decomposition.

In some embodiments, solvents are added to the ink formulation to dissolve the polymer binders at about 0.01-0.5 g/mL concentration, or preferably 0.02-0.2 g/mL, or preferably 0.5-0.1 g/mL. Some exemplary solvents include, but are not limited to: dichloromethane (DCM), ethylene glycol butyl ether (EGBE), and dibutyl phthalate (DBP), 2-butoxyethanol (2-Bu), and polyethylene glycol (PEG). Further, additional filler materials may be incorporated into the composition to adjust the overall viscosity. Some exemplary viscosity modifiers include fumed silica, nanoclay and graphene nanoplatelets, metal nanoparticles (Ag, Au, Cu), layered carbides $M_{n+1}AX_n$, (MAX) where (M=Ti; A=Al,Si, X=C; n=1 to 4) In some embodiments, 0.05-20 wt %, preferably 0.08-15 wt %, more preferably 0.1-10 wt % of one or more viscosity modifiers may be included.

One aspect of the invention provides the method of using the ink composition described above for printing magnetocaloric devices. The preferred printing method, in some embodiments, is direct ink writing (DIW, also known to be analogous to robocasting). Generally, but not exclusively, a printing ink of the present invention is loaded into the ink cartridge of existing and commercially available printing devices to realize 3D printing of solid structures and functional devices. In aspects of the invention, a method of manufacturing a magnetocaloric device comprises steps of: i) using an appropriate computer implemented software that is well known in the art to determine the three-dimensional design of the magnetocaloric device; ii) loading an appropriate amount of the 3D printing composition into an ink cartridge of a 3D printer; iii) receiving or retrieving a 3D model of a magnetocaloric device with a printing parameter; iv) printing the magnetocaloric device with the 3D printer. In some embodiments, an extrusion-based printing process (i.e. DIW) is used to extrude the ink material directly without melting of the magnetocaloric powder. In these embodiments, the printing ink exhibits shear-thinning property that has a low viscosity to maintain its fluidity while being extruded out of the nozzle but after the extrusion, a high viscosity is achieved for the material to maintain its shape on the printing bed.

The printing parameter may also include an extrusion pressure of 0.05-14 bar, preferably 0.08-12 bar, more preferably 0.1-10 bar. In some embodiments, the magnetocaloric composition is uniform within the printed device. Alternatively, multiple magnetocaloric inks may be used to manufacture the magnetocaloric devices with a compositional or functional gradient. In these embodiments, the inner portion of the device has a higher concentration of the composition than an outer portion of the device. In addition, in some embodiments, the printing method may further comprise a magnetic field around the ink cartridge to align the magnetocaloric materials during printing.

Another 3D solid forming method, in some embodiments, is referred to as a cold extrusion process. Generally, but not exclusively, an ink composite of the present invention replaces the typical materials of metals, polymers, ceramics, concrete, modeling clay of existing and commercially available cold extrusion devices, in particular, within the ink feeder. The ink material is pushed through a die of the desired cross-section, e.g. a cross-section with tubular arrays, being extruded into magnetocaloric devices of a fixed cross-sectional profile. The term "die" used herein refers to a specialized tool used in extrusion-based printing or manufacturing to form or cut material to a desired shape or profile. Alternatively, any other extrusion processes known in the art (e.g., microextrusion, friction extrusion, warm extrusion, hot extrusion, etc.) may also be used with an effective temperature and/or extrusion pressure known in the art, which may be adjusted accordingly based on the material and/or intended purposes of the 3D ink composition.

In preferred embodiments, the method of manufacturing a magnetocaloric device may further comprise additional steps of controlling porosity on multiple scale levels to generate a scaffold structure with varying porosity that includes macroporosity (50-1000 microns), microprosity (1-50 microns) and nanoporosity (less than 1.0 micron). In some embodiments, the heat transfer efficiency of the magnetocaloric devices is affected by creating compositionally and functionally graded magnetic structures. in particular, the transition temperature of magnetocaloric device increases gradually from cold region to hot region. In some embodiments, additional steps of designing spatial optimization of channels and pathways for the cooling water are included to improve the heat exchange efficiency.

Figure 2:
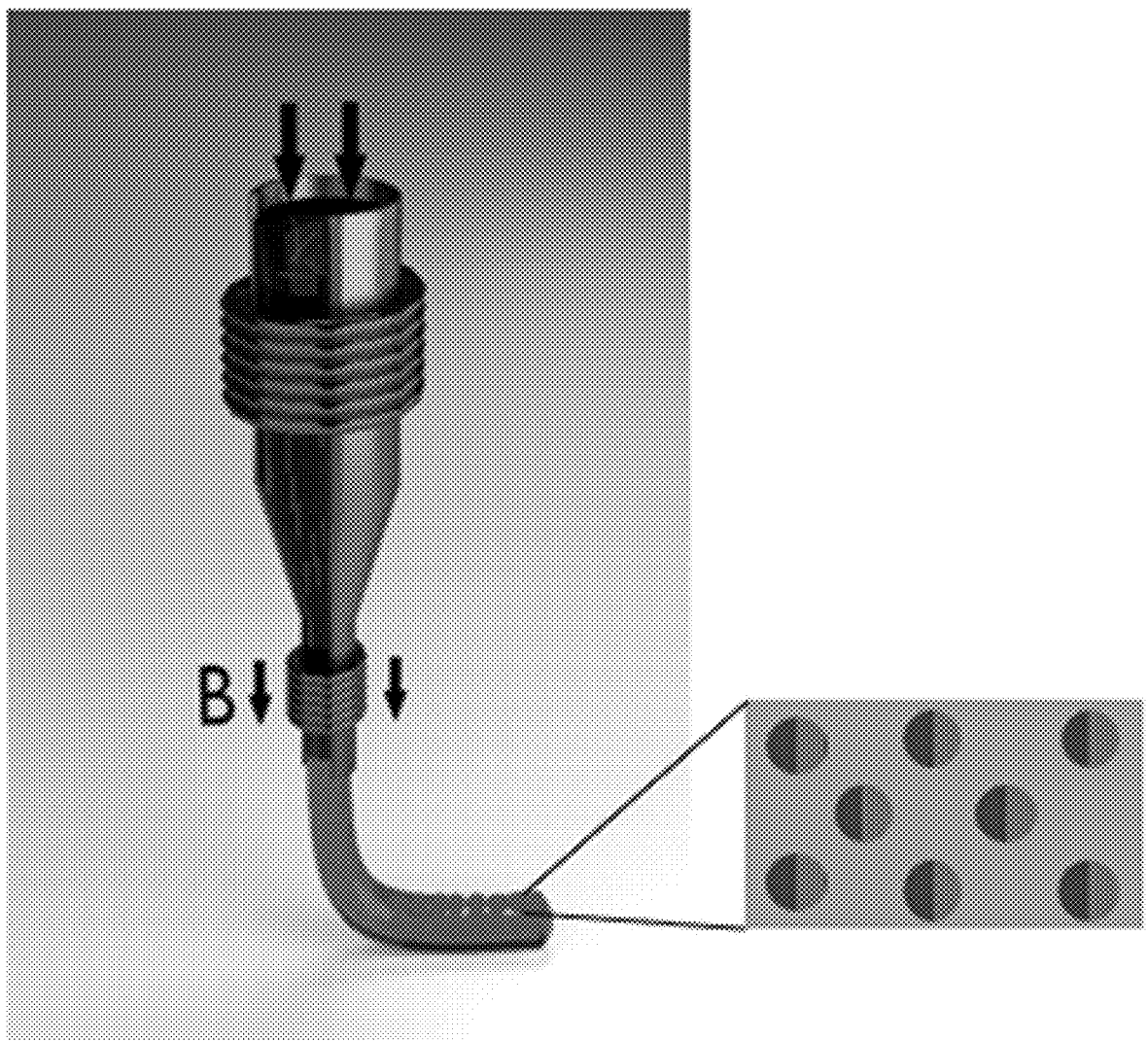
FIG. 2 is a schematic illustrating magnetic-field-aided 3D printing to align the magnetic particles to their easy axis of magnetization.

FIG. 2 shows that during the printing process, the alignment of the magnetic particles in the ink formulation under the magnetic field B applied may be achieved by applying an external magnetic field around the ink cartridge and nozzle. The magnetic field is applied using multiple windings of electromagnetic coils on the nozzle. FIG. 2. shows 2 set of windings applying magnetic field at the inlet and at the outlet of the nozzle both in axial direction. There can also be only one set of winding coils to apply the required magnetic field on the ink mixtures. The magnetic particles with higher magnetic moment will align their easy axis of the crystal lattice along the direction of the applied magnetic field at lower magnetic fields. The particles with lower magnetic moment will align their easy axis of crystal lattice along the direction of the applied magnetic field at higher magnetic fields. The winding coils will be supplied with a current sufficient to rotate all the magnetic particles along the field direction. The polymer particles matrix (printed structure) that will be printed will have a magnetic easy axis along the direction of the applied magnetic field. FIG. 2 shows the printed particles all having north and south poles aligned in direction of applied magnetic field. Alignment may also take place at other locations in the printing process depending on the direction of the currents in the winding coils. The magnetocaloric effect is expected to be highest along the easy axes of the printed structure (see R. Barua et al., "Anisotropic magnetocaloric response in AlFe2B2," *Journal of Alloys and Compounds*, vol. 745, pp. 505-512, May 2018, doi:; K. N. Al-Milaji, S. Gupta, V. K. Pecharsky, R. Barua, H. Zhao, and R. L. Hadimani, "Differential effect of magnetic alignment on additive manufacturing of magnetocaloric particles," *AIP Advances*, vol. 10, no. 1, p. 015052, January 2020, doi:.

Following printing, the magnetocaloric article will be subjected to a two-stage sintering process, optionally in the presence of an externally applied magnetic field to improve magnetic anisotropy. It will first be heat-treated to remove the sacrificial polymer binder. Heating at ~300-450° C. for 30 minutes to 2 hours is generally sufficient. Then, the magnetocaloric article will be sintered at high temperatures for prolonged periods to promote grain growth in the printed structure and densification of the printed structure. A suitable sintering cycle may include temperatures ranging from 900-1500° C. for periods of 4 to 24 hours. During the sintering heat-treatment, inert gas such as nitrogen, argon, optionally with a small fraction of hydrogen will preferably flow through the furnace to prevent oxidization of the additives added to promote thermal conductivity and magnetic particles. All operating conditions will ultimately depend upon chemistry and composition of the ink formulation.

A particular advantage of the ink formulations and 3D printing method is that they allow for realization of functionally-graded magnetocaloric structures wherein the composition of the working material will be varied spatially along the direction of heat transfer such that the transition temperature at any given cross-section is close to the local average temperature during operation. That is, the printed structure may have more of one type of magnetocaloric material on one side, and less on another side, such that when subjected to a magnetic field, the structure becomes hotter on one side than on the other side. The printed structure may have different magnetocaloric formulation components in different areas to achieve a variation of different heating and cooling in different areas. This can be accomplished by different techniques.

First, using an extrusion-based 3D printer featuring a single nozzle, multiple articles can be printed with magnetocaloric materials with different transition temperatures. These can then be integrated and assembled in the order of their transition temperatures to maximize the heat exchange efficiency.

Figure 3:
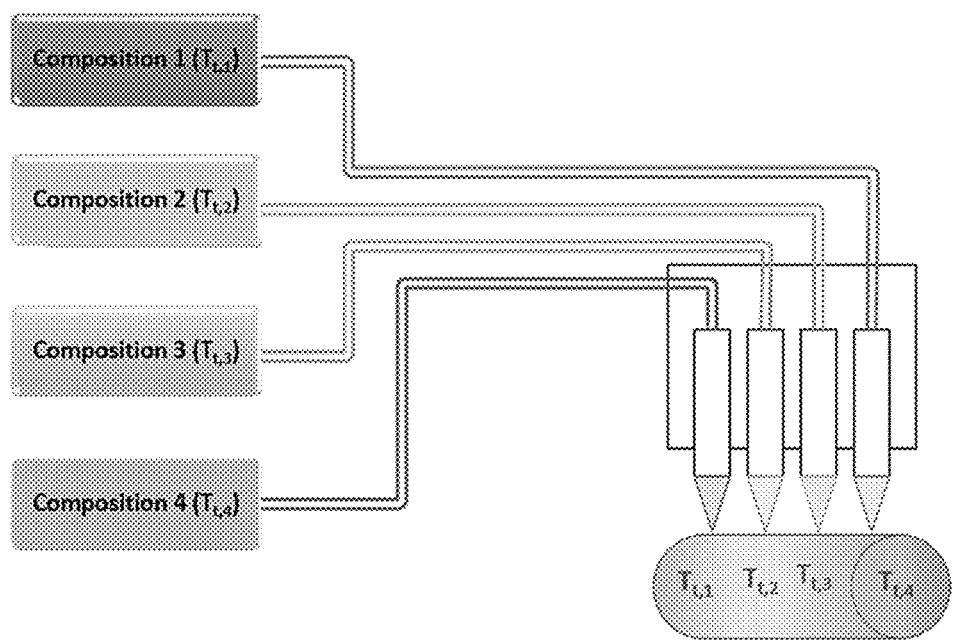
FIG. 3 is a schematic illustrating 3D printing of a monolithic multi-material/composition magnetocaloric structure using an extrusion-based printer with a multi-nozzle design.
Figure 4A:
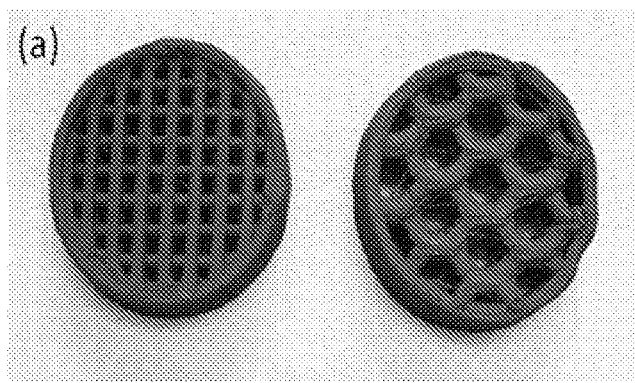
FIG. 4A-D is a multi-panel photographic arrangement which shows in panels (a) and (b) printed magnetic cylinders with grid channels, respectively; and shows in panel (c) the printing process; and shows in panel (d) the 3D printer used to print the prototypes.
Figure 4B:
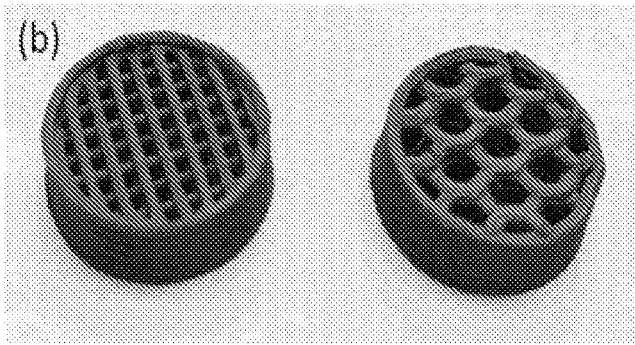
Figure 4C:
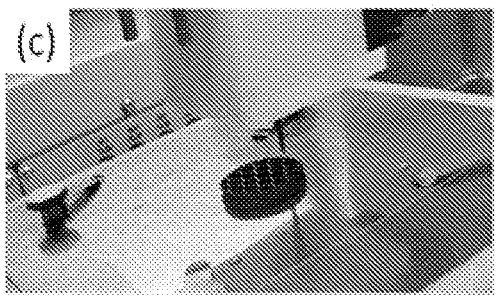
Figure 4D:
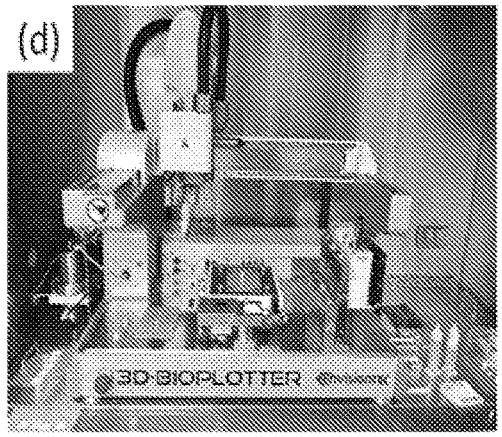
Figure 5A:
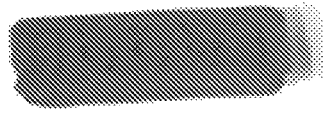
FIG. 5A-E is a multi-panel display showing in panel (a) an image of a 3D-printed magnetocaloric test scaffold; showing in panel (b) Transmission electron microscope (TEM) image of Lanthanum Calcium Manganese Oxide (LCMO) nanoparticle; respectively showing in panels (c and d) Scanning electron microscope (SEM) image of 3D printed sample before and after heat-treatment; and showing in panel (e) a graph of the temperature-dependence of the magnetic entropy change shows that the magnetocaloric response of the LCMO powders and 3D printed sample is comparable.
Figure 5B:
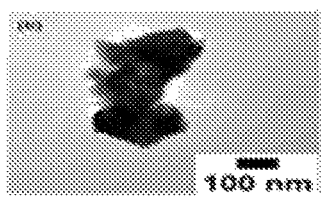
Figure 5C:
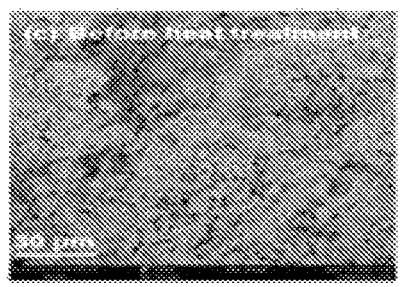
Figure 5D:
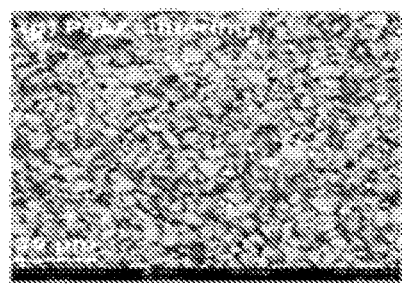
Figure 5E:
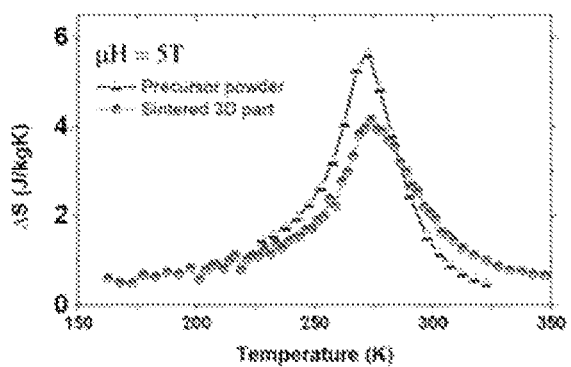
Figure 6A:
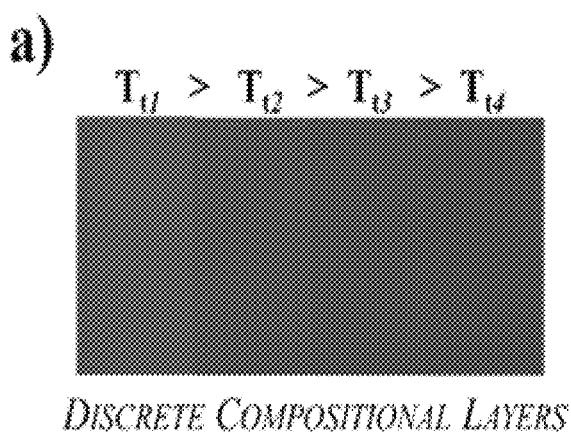
FIG. 6A-B shows in panel (a) the format and performance of a discrete compositionally graded heat exchange regenerator in an active magnetic regenerator (AMR) device, and in panel (b) the format and performance of a continuously compositionally grade heat exchange regenerator in an AMR device.
Figure 6A:
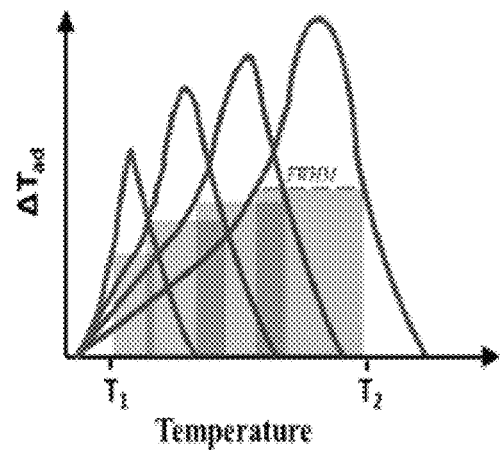
Figure 6B:
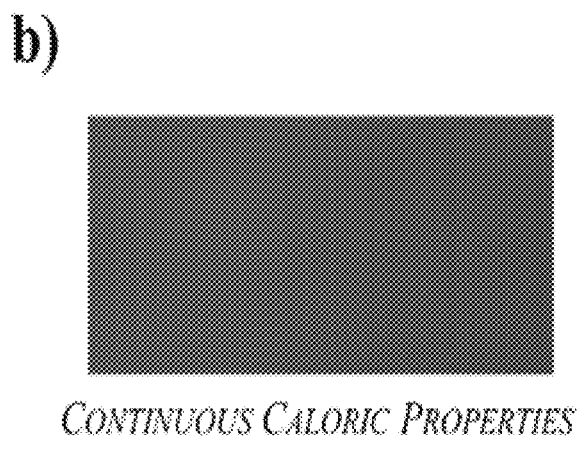
Figure 6B:
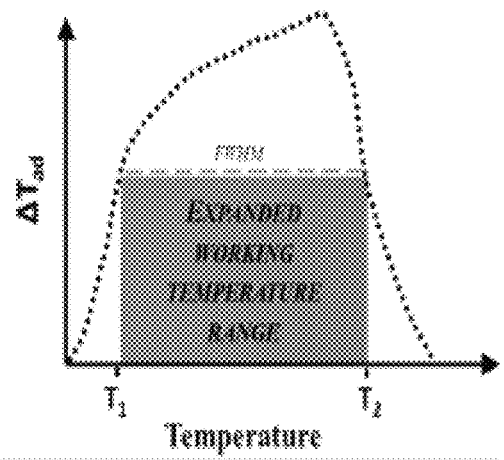

Second, as shown in FIG. 3, using an extrusion-based 3D printer featuring multi-nozzle design, a single monolithic multi-material article can print directly using for ink-formulations that differ slightly in their choice of magnetocaloric powder (e.g., morphology, size, and composition may vary). FIG. 3 represents an extrusion-based 3D printer featuring a multi-nozzle design for printing a compositionally graded multi-material part using ink formulations that differ slightly in the composition of the magnetocaloric powder. Specifically, the schematic shows magnetocaloric powders of four compositions: Composition 1, Composition 2, Composition 3, and Composition 4. The magnetic transition temperature corresponding to these compositions is $T_{t,1}$ $T_{t,2}$ $T_{t,3}$ and $T_{t,4}$. As shown in FIG. 3, the magnetocaloric response is observed in the vicinity of the magnetic transition temperatures.

The magnetocaloric devices which are made using the inks and 3D printing methods described are wide ranging. For example, they can be used for manufacturing magnetic cooling devices, magnetic heat pumps, for home and industrial grade refrigerators, electronics cooling, etc. coolers, and heat exchangers or generators. The inventive inks and 3D printing methods have particular application for use in refrigerators.

Example

For exemplary purposes, an ink formulation according to the invention has been used to print, via a 3D printing operation, magnetocaloric components and components having micro channeled architecture.

Ink formulation: The magnetic ink comprises magnetic particles (rare-earth and transition-metal based ferrous alloys, perovskites, spinel ferrites etc.) mixed with polyethylene oxide (PEO) incorporated within a tri-solvent system.

For every cc of magnetic powder, 0.60 g ethylene glycol butyl ether (EGBE), 0.03 g dibutyl phthalate (DBP), and 0.70 g dichloromethane (DCM) are added and mixed by a planetary centrifugal mixer (Thinky USA) for 20 minutes at 2000 RPM to form a particle slurry. PEO is dissolved in 12.5 mL DCM per cc of polymer and mixed by a vortex mixer for 1 minute at 3000 RPM. The PEO solution is retained for 24 hours to ensure a uniform solution. Graphene nanoplatelets powder of 1% to 10% in weight with respect to the magnetic powder is added to the particle slurry and mixed by the Thinky mixer for 1 minute at 2000 RPM. The particle slurry and polymer are then combined and mixed by the Thinky mixer for 8 minutes at 2000 RPM to form the magnetic ink. The ink is transferred to a printing cartridge and stored at 4° C. when not in use.

Demonstration of the feasibility of printing samples with micro-channeled architecture: The above-mentioned magnetic ink is printed on a 3D printer (EnvisionTec, 3D Bioplotter). The printing speed is 5-10 mm/s depending on the extrusion pressure, with printing nozzles of 400 μm and 800 μm. This 3D printed sample is next subjected to a two-stage sintering process. It is first heat-treated at ~400-450° C. for 30 minutes to remove the sacrificial polymer binder and then sintered at high temperatures ranging 900-1100° C.) for prolonged periods (4 to 24 hours depending upon sample chemistry and composition) to promote grain growth and densification of the printed structure. During heat-treatment, nitrogen is flown through the furnace to prevent oxidization of the graphene and magnetic particles. The printed sample isotropically shrinks approximately ~15% by volume during post-processing.

FIG. 4 show printed cylinders (~ 20 mm in diameter) with grid channels in panels a and b, and the 3D printing process and printer used to make the prototypes in panels c and d. Geometry of the channels are preferably designed to enhance heat transfer and minimize pressure drop, e.g., wavy channels, transverse fin channels, etc., can be designed using a modeling software and print on the 3D printer.

Processes may also be used for aligning the magnetic particles during printing and post-processing to maximize the magnetocaloric response. Applying a magnetic field has been employed in various printing processes (inkjet printing (Song, et al., Journal of Applied Physics, 2014, 115, 17E308) and extrusion-based 3D printing (Kim, et al., Nature, 2018, 558, 274-280)) to align the magnetic particles along their easy axes leading to anisotropic magnetic properties. With the present process, it is the first demonstration of applying a magnetic field to align the magnetocaloric materials during the fabrication of the magnetocaloric devices.

Demonstration of the feasibility of printing magnetocaloric components: FIG. 5, at panels (a-d), shows 3D printed test scaffolds fabricated using $La_{0.6}Ca_{0.4}MnO_3$ (lanthanum calcium manganese oxide, LCMO) nanoparticles (~60-80 nm in diameter). The functional magnetocaloric response is defined as a magnetic material's ability to undergo a temperature change upon application or removal of magnetic field in adiabatic conditions and it is indirectly quantified by evaluating the magnetic entropy change $\Delta S$ as calculated from Maxwell's Relations:

$$\Delta S\ (H, T) = \mu_0 \int_0^{H_{max}} \left(\frac{\partial M}{\partial T}\right)_H dH$$

Here, μ is the permeability of free space, $$\frac{\partial M}{\partial T}$$

is the temperature derivative of the magnetization and $H_{max}$ is the maximum applied magnetic field. FIG. 5, at panel (e), shows that the temperature-dependence of magnetic entropy change in the LCMO powders and 3D printed samples is comparable under the applied magnetic field (μH). Thus, panel (e) of FIG. 5 demonstrates that the ink formulation and printing process can be successfully used to manufacture magnetocaloric devices.

Controlling and optimizing the process parameters may be used to achieve desired mechanical properties, macro-structure, microstructure, and magnetofunctional responses. Magnetocaloric regenerators with favorable heat exchanger geometries (example: microchannels, pitot tubes, pin fins) can be down-selected for 3D printing for minimizing mechanical stress/strain at features while maximizing the caloric effect and heat extraction efficiency. In addition, modules of magnetocaloric devices may be printed using the magnetocaloric materials with different transition temperatures. These may be integrated and assembled to maximize the heat exchange efficiency in the order of their transition temperatures. Different modules and fluid channels may also be connected through matching pins and channels.

FIG. 6 represents the graded magnetocaloric bed with four discrete chemical compositions with magnetic transition temperatures $T_{r1}$, $T_{r2}$, $T_{r3}$ and $T_{r4}$, respectively. FWHM stands for Full Width Half Maximum of the magnetic entropy change curve (FWHM is the width of a line shape at half of its maximum amplitude). ΔTad is the temperature change of a magnetocaloric material in adiabatic conditions. During steady state device operation of magnetocaloric regenerators there is a temperature gradient inside the regenerator in the direction from the cold to the hot side. Since the caloric effect of a given material composition peaks at a single temperature close to the ferroic transition temperature ($T_r$) and falls off rather quickly away from the peak temperature (see FIG. 6 at panel (a)), it follows that only a single cross-section of the regenerator will actually experience the maximum functional response. This is detrimental for device performance and leads to the concept of graded regenerators where the composition of the working multi-caloric alloy is varied spatially along the direction of heat transfer such that $T_r$ at any given cross-section is close to the local average temperature during operation (see FIG. 6 at panel (b)). The invention can be used to manufacture both discrete compositionally graded and continuously compositionally graded heat exchange regenerators as shown in FIGS. 6(a) and (b) using the methods described above in conjunction with FIG. 3.

Figure 7:
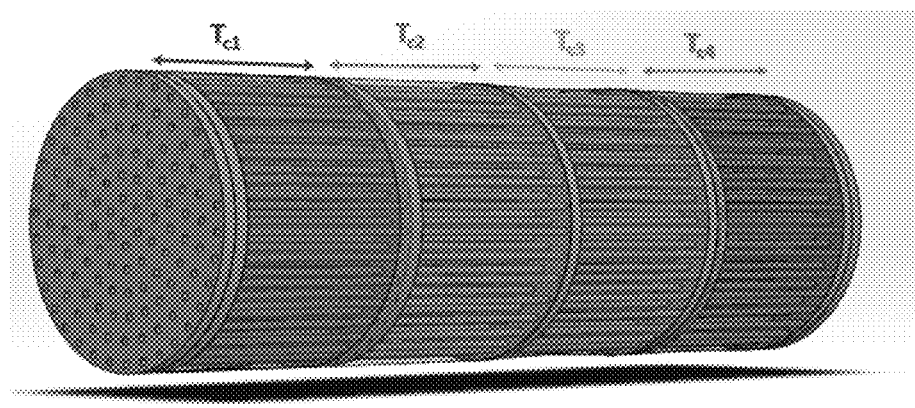
FIG. 7 shows a 3D printed multimaterial magnetocaloric heat exchanger comprising a cascaded or "graded" magnetic transition temperature that varies continuously along the length.

FIG. 7 shows a compositionally-graded multi-material micro-channeled heat exchanger structure. Each color represents four magnetocaloric material of slightly differing compositions with a magnetic transition temperatures $T_{r1}$, $T_{r2}$, $T_{r3}$ and $T_{r4}$, respectively. FIG. 7, by example, shows a 3D printed multimaterial magnetocaloric heat exchanger comprising a cascaded or "graded" magnetic transition temperature that varies continuously along the length.

Conventional machining methods and powder bed fusion methods such as (example: milling, boring and drilling) allow limited control over the internal structure. By contrast, the 3D printing methodology described herein provides an unmatched capability to print a compositionally graded magnetocaloric structure.

The invention claimed is:

1. An ink formulation, comprising:
   20-95 wt % solids of magnetocaloric material;
   5-80 wt % solids of polymeric binder; and
   a plurality of solvents comprising each of dichloromethane (DCM), ethylene glycol butyl ether (EGBE) and dibutyl phthalate (DBP), 2-butoxyethanol (2-Bu), and polyethylene glycol (PEG), and
   wherein the polymeric binder and one or more solvents have a polymer-to-solvent ratio of 0.01 g/mL-0.5 g/mL.

2. The ink formulation of claim 1 wherein the magnetocaloric material is one or more magnetocaloric powders selected from the group consisting of
   FeRh,
   $Gd_5(Si_{1-x}Ge_x)_4$ where x ranges from 0 to 1,
   Co- and H-doped $La(Fe_{13-x}Si_x)$ where x ranges from 0 to 1,
   MnFe(P, As, Si),
   $AlT_2B_2$ where T is selected from the group consisting of Fe, Mn, Ni, and Co,
   MnM'X where M' is selected from the group consisting of Fe, Co, and Ni, and
   where X is selected from the group consisting of Si, Ga, Ge, and Al, and
   $R_{1-x}M_xMnO_3$, where R is a lanthanide, M is selected from the group consisting of Ca, Sr and Ba, and x ranges from 0 to 1.

3. The ink formulation of claim 1 wherein the polymeric binder includes one or more polymers selected from the group consisting of polylactic acid (PLA), poly(lactic-co-glycolic) acid (PLGA), polystyrene (PS), and polyethylene oxide (PEO).

4. The ink formulation of claim 1, further comprising up to 10 wt % thermally conductive additives.

5. The ink formulation of claim 1, further comprising one or more fillers selected from the group consisting of nanoclay, graphene nanoplatelets, metal nanoparticles, and $Ti_3(Al,Si)C_2$.

* * * * *